United States Patent Office 2,789,036
Patented Apr. 16, 1957

2,789,036

PURIFICATION OF CONCENTRATED ALKALI METAL HYDROXIDE BY ION EXCHANGE

Arthur B. Tillman, Painesville, Ohio, assignor to Diamond Alkali Company, Cleveland, Ohio, a corporation of Delaware No Drawing. Application December 27, 1952, Serial No. 328,257

6 Claims. (Cl. 23—184)

This invention relates to the purification of solutions of alkali metal hydroxides with respect to unwanted impurities therein, and more particularly relates to the purification of concentrated solutions of sodium hydroxide, especially as to anions, such as chlorate, sulfate, chloride and ferrite, by ion exchange methods.

Large volumes of alkali metal hydroxide solutions, which are exemplified by caustic soda solutions, are manufactured by the electrolytic method and normally are concentrated to concentrations of the order of 50% or more in caustic soda for commercial disposition of the solutions. It is a characteristic, especially of the diaphragm cell type of electrolysis of brine, that caustic soda produced by this means is contaminated by small but quite significant quantities of chlorate, sulfate, chloride and ferrite ion. To a lesser extent, the same problem applies to other alkali metal hydroxides, such as potassium, rubidium, cesium and the like, but in view of the much broader industrial use of caustic soda, the problem is paramount in the field of that chemical and the invention will be discussed largely in connection with it.

The art is replete with a great number of suggestions for the treatment of caustic soda solutions, whether of the 8–11% concentration in caustic soda as recovered from conventional diaphragm cells or the more concentrated solutions which have been passed through one or more steps of concentration. In any case, the same problem obtains that the removal of these small but significant quantities of impurities represents an expense of great significance to the caustic soda manufacturer and yet the material with its original impurities often fails to meet commercial specifications, especially those set up by rayon manufacturers, soap manufacturers, and other mass users of caustic soda solutions.

Many previous proposals for the removal of one or more of the above-mentioned anions from caustic soda solutions are highly effective and highly efficient and result in caustic soda solutions which are able to pass even the most stringent specifications. None of the methods heretofore proposed, however, is entirely satisfactory from the standpoint of the expense to which the manufacturer of the caustic soda is put, and with increasing costs of purification operations and increasing capital costs in purification plants, the industry continues its search for inexpensive means of removing these ions down to the specifications set by the users of the material, which inexpensive means will be more attractive from operation and capital standpoints than the present rather expensive means of purification.

The use of anion exchange resins to remove undesired or perhaps desired anions from aqueous and other systems is well-known. Normally, however, these techniques have not been applied to the treatment of solutions having a high concentration of a single chemical, such as a 50% caustic soda solution which may be contaminated in only minor respects by the impurities mentioned above. This situation has risen partly because most of the basic anion exchange type of resins are regenerated, i. e., purified with respect to the anions which they have removed from previously treated systems, by treating with caustic soda itself. Other reasons for not thinking of the use of basic anion exchange resins in the purification of caustic soda lie in the tremendous volumes of quite dilute caustic soda which would have to be treated by such means. Therefore, the art has not heretofore proposed the use of the basic anion exchange technique in purification of commercial caustic soda solutions for the reasons stated above.

It has now been discovered that the basic anion exchange technique may be applied to the treatment of extremely strong solutions of caustic soda for the removal of small quantities of unwanted anions from such systems with highly advantageous purification results and with potentially far less capital investment in equipment and far less labor cost than is the custom in the industry at the present time by conventional purification means.

The characteristics of the strongly basic anion exchange resins useful in the present invention are, of course, stability in the presence of strong caustic soda solutions and ability selectively to absorb the unwanted anions, especially chlorate, sulfate, chloride and ferrite, from the caustic soda solution which contacts the resins. Typical of a class of materials having these properties are the strongly basic anion exchange resins comprising quaternary ammonium salt of the type $R,R',R'',R'''N+\cdot a-$, especially where one of the R's is derived from polystyrene which in turn has been cross-linked with divinyl benzene and which type of structure tends to produce a resin insoluble in both aqueous and non-aqueous solvents. The remainder of the R's as described above in the above formula may be lower alkyl, lower hydroxy alkyl or halo-alkyl, such halo-alkyl radicals contemplating chlorinated, brominated or iodinated radicals. The symbol $\cdot a-$ is used to designate the anion.

The present invention being not concerned with the method of manufacturing resins, any suitable method of obtaining resins of the character described may be employed. Thus, in Bauman et al. Patent No. 2,614,099 is disclosed a means of obtaining quaternary ammonium base anion exchange resins of the chloro-methylated type discussed above. Other methods of preparing the resins will suggest themselves to those skilled in the art. The fundamental requirement is the lengthy, stable, insoluble, large cationic bodies secured to the quaternary ammonium group, which bodies have high capacity for absorption of ions.

While the present invention is not completely understood as to its theory of operation, it has been found that caustic soda solutions may be purified in accordance with the method of the present invention where the concentration of the caustic soda in the solution is of the order of about 25% or more. In particular, suitable concentrations of impure caustic soda for treatment in accordance with the present invention include those of the order of 25%, those of the order of 36%, and those of the order of 50%. As the handling of caustic soda solutions in connection with the resin in concentrations of much more than 50% is inconvenient, the invention is in general limited to substantially that concentration of caustic soda. It will be observed that the concentrations of caustic soda in the solutions mentioned are such that the solutes are for the most part very slightly dissociated, i. e., there is ionic dissociation of the solutes to an extent of less than 10%. It is believed that this low ionic dissociation of the solutes under these conditions accounts for the fact that the strongly basic anion exchange resins can absorb the unwanted anions which are present in low concentrations as impurities in the caustic soda solutions, while the caustic soda molecules largely pass through the resin unaffected and do not affect the resins.

The method of the present invention includes contacting a suitable bed of the quaternary ammonium type strongly basic anion exchange resins with a solution of caustic soda of the concentration mentioned and containing impurities of the type mentioned of the order of .96% chloride as NaCl, .04% sulfate as $Na_2SO_4$, .071% chlorate as $NaClO_3$, and .0017% ferrite as $Fe_2O_3$. Actually, of course, the above-mentioned percentages which are taken from a typical 50% caustic solution may vary considerably, depending upon the method of preparation of the caustic soda. Thus, chloride may go somewhat above 1% though its solubility in 50% caustic soda is soon exceeded, sulfate may go considerably higher than .04%, ferrite may go considerably higher than that shown, and chlorate may go as high as several percent in rather inefficient operations.

It is the peculiar character of this invention that even though a caustic soda solution is being purified by the strongly basic anion exchange resins, the resin may nevertheless be rejuvenated and reused simply by treatment with dilute caustic soda solution. This may be accomplished either by washing the resin with water, which will have the effect of washing it with dilute caustic soda solution or by completely cleaning it out with water and then rejuvenating it with dilute caustic soda solution optimum for the purpose intended.

In order that those skilled in the art may more particularly understand a preferred means of practicing the present invention, the following example is offered:

Example

A 30-inch bed of a quaternary ammonium salt derived from polystyrene linked with divinyl benzene and having a plurality of methyl groups attached to nitrogen, and being in the form of 1-inch average diameter particles, is regenerated with 9 lbs. of 4% sodium hydroxide solution per cubic foot of bed. The effluent from the bed after this treatment appears to be completely free of chloride. One-half gallon of caustic soda solution of an initial concentration of 49.48% in NaOH and containing impurities as noted in the table below is passed through the bed. While some difficulty is encountered with flow rate of the caustic soda through the bed, all of the caustic passes through the bed and is collected as noted below in a series of 235 ml. samples. The analytical results on the samples are set forth below, indicating the extent to which unwanted ions are removed:

| No. | NaOH | $Na_2CO_3$ | NaCl | $Na_2SO_4$ | $NaClO_3$ | $Fe_2O_3$ |
|---|---|---|---|---|---|---|
| Orig | 49.48 | .32 | .96 | .04 | .071 | .0017 |
| 0 | none | none | .017 | none | none | none |
| 1 | 16.19 | .19 | .30 | .020 | none | .0005 |
| 2 | 45.82 | .05 | .25 | .024 | none | .0011 |
| 3 | 48.85 | .12 | .58 | .024 | .016 | .0010 |
| 4 | 49.03 | .07 | .61 | .024 | .027 | .0010 |
| 5 | 49.22 | .14 | .64 | .026 | .037 | .0010 |
| 6 | 49.35 | .22 | .64 | .026 | .046 | .0010 |
| 7 | 49.39 | .07 | .67 | .026 | .044 | .0010 |
| 8 | 49.15 | .11 | .68 | .028 | .044 | .0010 |
| 9 | 47.87 | .034 | .66 | .028 | .046 | .0010 |
| 10 | 36.75 | .085 | .64 | .028 | .035 | .0008 |

It is noted that the samples Nos. 1 and 10 are somewhat more dilute in caustic soda but this is accounted for by the void volume already in the resin. It is noted that the caustic soda concentration is substantially unchanged in the recovered materials but that the chloride, sulfate, chlorate and ferrite concentrations are significantly reduced. The resin, which has shrunk somewhat in volume from the treatment and darkened somewhat, is regenerated with further 4% caustic soda solution and treated with a further sample from the same sample as the original treatment. Purification to substantially the same effect is obtained.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of purifying alkali metal hydroxide solutions of a concentration of at least 25% by weight alkali metal hydroxide and contaminated with at least one of the ions selected from the group consisting of chloride, sulfate, chlorate and ferrite, which includes the steps of contacting said solution with a strongly basic anion exchange resin and subsequently recovering a purified effluent of substantially the same alkali metal hydroxide concentration.

2. The method of purifying caustic soda solutions of a concentration of at least 25% by weight caustic soda and contaminated with at least one of the ions selected from the group consisting of chloride, sulfate, chlorate and ferrite, which includes the steps of contacting said solution with a strongly basic anion exchange resin and subsequently recovering a purified effluent of substantially the same caustic soda concentration.

3. The method of purifying caustic alkali solutions of a strength of at least 25% by weight caustic alkali, which includes the steps of contacting such solution with a quaternary ammonium salt of the type R, R', R'', R''' N+·$a$—, wherein R is derived from polystyrene cross-linked with divinyl benzene and R', R'' and R''' are selected from the group of lower alkyl, hydroxy substituted lower alkyl, and halide substituted lower alkyl, and ·$a$— is the anion, and subsequently recovering a purified effluent of substantially the same caustic alkali concentration.

4. The method of purifying caustic soda solutions of a strength of at least 25% by weight caustic soda, which includes the steps of contacting such solution with a quaternary ammonium salt of the type R, R', R'', R''' N+·$a$—, wherein R is derived from polystyrene cross-linked with divinyl benzene and R', R'' and R''' are selected from the group of lower alkyl, hydroxy substituted lower alkyl, and halide substituted lower alkyl, and ·$a$— is the anion, and subsequently recovering a purified effluent of substantially the same caustic soda concentration.

5. The method of purifying caustic soda solutions of a concentration of substantially 50% in caustic soda and contaminated with at least one of the ions selected from the group consisting of chloride, sulfate, chlorate and ferrite, which includes the steps of contacting such solution with a strongly basic anion exchange resin and subsequently recovering a purified effluent of substantially the same caustic soda concentration.

6. The method of purifying caustic soda solutions of a concentration of substantially 50% in caustic soda and contaminated with at least one of the ions selected from the group consisting of chloride, sulfate, chlorate and ferrite which includes the steps of contacting such solution with a quaternary ammonium salt of the type R, R', R'', R''' N+·$a$—, wherein R is derived from polystyrene cross-linked with divinyl benzene and R', R'' and R''' are selected from the group of lower alkyl, hydroxy substituted lower alkyl, and halide substituted lower alkyl, and ·$a$— is the anion, and subsequently recovering a purified effluent of substantially the same caustic soda concentration.

References Cited in the file of this patent

UNITED STATES PATENTS

| | | |
|---|---|---|
| 2,309,412 | Muskat | Jan. 26, 1943 |
| 2,591,573 | McBurney | Apr. 1, 1952 |
| 2,606,098 | Bauman | Aug. 5, 1952 |
| 2,614,099 | Bauman | Oct. 14, 1952 |

OTHER REFERENCES

Davies and Nancollas article in "Nature," 165, 237 (1950).

"Ind. and Eng. Chem.," vol. 43, No. 5, pages 1088–1093.

Kunin and Myers' book "Ion Exchange Resins," pages 25 and 44, 1950 ed., John Wiley and Sons, Inc., New York.